United States Patent
Conradi

(10) Patent No.: US 8,126,931 B2
(45) Date of Patent: Feb. 28, 2012

(54) METHOD AND APPARATUS FOR DISPLAYING THE COMPOSITION OF A DATA STRUCTURE DURING RUNTIME

(75) Inventor: Christian Conradi, Walldorf (DE)

(73) Assignee: SAP AG, Walldorf, DE (US)

( * ) Notice: Subject to any disclaimer, the term of this patent is extended or adjusted under 35 U.S.C. 154(b) by 742 days.

(21) Appl. No.: 12/138,906

(22) Filed: Jun. 13, 2008

(65) Prior Publication Data

US 2009/0313283 A1    Dec. 17, 2009

(51) Int. Cl.
*G06F 17/30* (2006.01)
(52) U.S. Cl. ......................................................... 707/802
(58) Field of Classification Search .................. 707/609, 707/687, 705, 790, 791, 802, 829
See application file for complete search history.

(56) References Cited

U.S. PATENT DOCUMENTS

| | | | |
|---|---|---|---|
| 7,062,500 B1* | 6/2006 | Hall et al. ............................. | 1/1 |
| 7,350,198 B2* | 3/2008 | Kluger et al. ................. | 717/140 |
| 7,421,699 B2* | 9/2008 | Brendle et al. ................ | 719/310 |
| 7,954,111 B2* | 5/2011 | Waguet .......................... | 719/318 |
| 2006/0129974 A1* | 6/2006 | Brendle et al. ................ | 717/108 |
| 2007/0283325 A1* | 12/2007 | Kumar et al. .................. | 717/122 |
| 2008/0162536 A1* | 7/2008 | Becker et al. .................. | 707/102 |

OTHER PUBLICATIONS

Cohen et al, Automatic Composition of Data Structures to Represent Relations, IEEE 1992, pp. 182-191.*
Gebhardt et al, Introducing the next generation of ABAP debugging—the New ABAP Debugger, SAP Professional Journal o Jan./Feb. 2006, pp. 71-98.*

* cited by examiner

*Primary Examiner* — Fred I Ehichioya
(74) *Attorney, Agent, or Firm* — Fountainhead Law Group PC

(57) ABSTRACT

In one embodiment the present invention includes a computer-implemented method for dynamically displaying, during runtime, the composition of a data structure in a tabular format. During execution of an application, a command indicating the name of a data structure as an argument is executed, thereby causing a dynamic data structure display generator to request the type of the particular data structure whose name is included in the command as an argument. Upon receiving the type and the location of the data structure, the dynamic data structure display generator selects a process to analyze the data structure. Using the selected process, the data structure is analyzed and its elements are systematically communicated to a user interface service, which is responsible for displaying, in a tabular format, the elements (names and values) of the data structure.

15 Claims, 12 Drawing Sheets

Results Display for Traced Process

Table (FUNCTION=Z_CC_TEST_TRACE1|TYPE=LT_T_TABLE)

| CHAR | CHAR2 | INT | TAB | STRU-CH1 | STRU-CH2 | STRU-SIMP | STRU-SIMP | STRU-SIM | STRU-TAB | INT2 |
|------|-------|-----|-----|----------|----------|-----------|-----------|----------|----------|------|
| T | TEST | 3 |  |  |  |  |  | 0 |  | 4 |
| T | TEST | 3 |  |  |  |  |  | 0 |  | 4 |

FIG. 11

METHOD AND APPARATUS FOR DISPLAYING THE COMPOSITION OF A DATA STRUCTURE DURING RUNTIME

CROSS REFERENCE TO RELATED APPLICATIONS

Not Applicable.

BACKGROUND

The present invention relates generally to software development, and in particular, to a method and apparatus for dynamically displaying, at runtime, the composition of application data contained in certain data structures (e.g., structures, tables, fields, or objects of object oriented programming).

Complex software systems (e.g., an SAP R/3 system) tend to evolve over time as software developers develop new applications and add new features to existing applications. Although attempts are generally made to reuse software code modules and associated data structures (e.g., objects, methods, functions, sub-routines, data structures, tables, fields and so on), there is often a certain amount of overlap and redundancy that occurs. This of course leads to a large collection of software code modules and data structures that are available and in use at any given time. Consequently, with complex software systems, the significant number of software code modules and data structures makes it virtually impossible for a software application developer to maintain a working knowledge of the details of the entire collection of available and in-use software code modules and data structures. Furthermore, due to various software code dependencies, it is often the case that the proper operation of one application may be dependent upon one or more code modules and/or data structures for which a software developer knows very little about. Despite being unfamiliar with one or more particular data structures, for the sake of rapid application development, software developers frequently utilize the unfamiliar data structures.

For a variety of reasons, a software developer may desire to have an application display the composition and data contents of a particular data structure in a tabular format to a user. For example, if the data structure is storing relevant application data, it may be desirable to display the application data in a tabular format. It is also possible that a software developer may desire to display the composition and data contents of a particular data structure—particularly a data structure that is unfamiliar to the developer—for the purpose of debugging an application.

In general, in order to have an application display the composition and data contents of a data structure, the software developer must hard code the required instructions or commands into the application code of the application that is to display the elements of the particular data structure. For instance, a software developer may add instructions or commands that specifically analyze the particular data structure in question, and then display the contents of the particular data structure. This hard-coding approach requires that the software developer have an understanding of the particular data structure, including its location (e.g., within the code) and its structural makeup. Furthermore, analyzing several different data structures requires customized software code to be added for each data structure to be analyzed and displayed. For instance, to display the particular data elements of a table (e.g., field names and values), the necessary instructions or commands must be tailored to that particular table. A second, different set of instructions or commands would be required to display the data elements of an interface, complex structure, or some other type of data structure. Consequently, the programming resources involved in hard-coding the necessary commands or instructions to display the composition of several data structures makes this hard-coding approach very time consuming and therefore undesirable.

Thus, there is a need for an improved way to dynamically display, at runtime, the composition of a data structure. The present invention solves these and other problems by providing a method and apparatus for dynamically displaying the composition of a data structure during runtime.

SUMMARY

Embodiments of the present invention enable the dynamic display, during runtime, of the composition and data contents of a data structure in a tabular format. In one embodiment of the present invention, during the execution of an application, the application executes a command for displaying the composition of a data structure in a tabular format. For instance, the command calls a service or function that takes as an input parameter a data structure or any other data object. Upon calling the particular service or function, a system-level reflection service is invoked to identify the type of the particular data structure that is to be displayed in a tabular format. Based on the type of the particular data structure to be displayed, a process is selected to analyze the composition and data contents of the data structure. After analyzing the data structure and reading each element and its corresponding value, the elements are communicated to a presentation logic, which ultimately displays the data in a tabular format.

The following detailed description and accompanying drawings provide a better understanding of the nature and advantages of the present invention.

BRIEF DESCRIPTION OF THE DRAWINGS

FIG. 5 illustrates an example display of a complex table type of data structure, and its associated elements and assigned values, as may be generated by an embodiment of the invention.

FIGS. 10 and 11 illustrate an example display of a complex structure type of data structure and a table type sub-structure that is referenced by a user-selectable link in the complex structure, according to an embodiment of the invention.

DETAILED DESCRIPTION

Described herein are techniques for dynamically displaying, at runtime, the composition of a data structure. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In one particular embodiment of the invention, a dynamic data structure display application or logic operates as an application or kernel-level service in an SAP R/3 environment. Accordingly, an embodiment of the invention may be utilized to analyze and display the composition of various ABAP (Advanced Business Application Programming) objects and internal data structures. Alternative embodiments of the invention, however, may be utilized in other software system environments, and may be used to analyze and display the composition of data structures that conform to the standards of a wide variety of other programming languages, such as Java objects, and so on. Those skilled in the art will appreciate that the present invention, while described in the context of the specific examples presented herein, may have application in a wide variety of software systems and with varying programming languages not specifically described in detail herein.

As used herein, the term "data structure" is meant to encompass any variety of programming constructs for encapsulating data. For instance, a data structure includes, but is certainly not limited to the following types: a field, a simple structure, a complex structure, a simple table, a complex table, an interface, a class, an object, a data reference, and/or an object reference. As is customary, the individual components of a data structure are referred to herein as elements. Depending upon the particular data structure type, a data structure may have one, or a large number of, elements. Generally, each element is provided with a name and is assigned a value. As described in greater detail below, in one embodiment of the invention, the dynamic data structure display tool (sometimes referred to as a process, application or logic) operates to analyze the elements of a particular data structure and display a graphical representation of the elements (e.g., element name and assigned value) in a tabular format.

Figure 1:
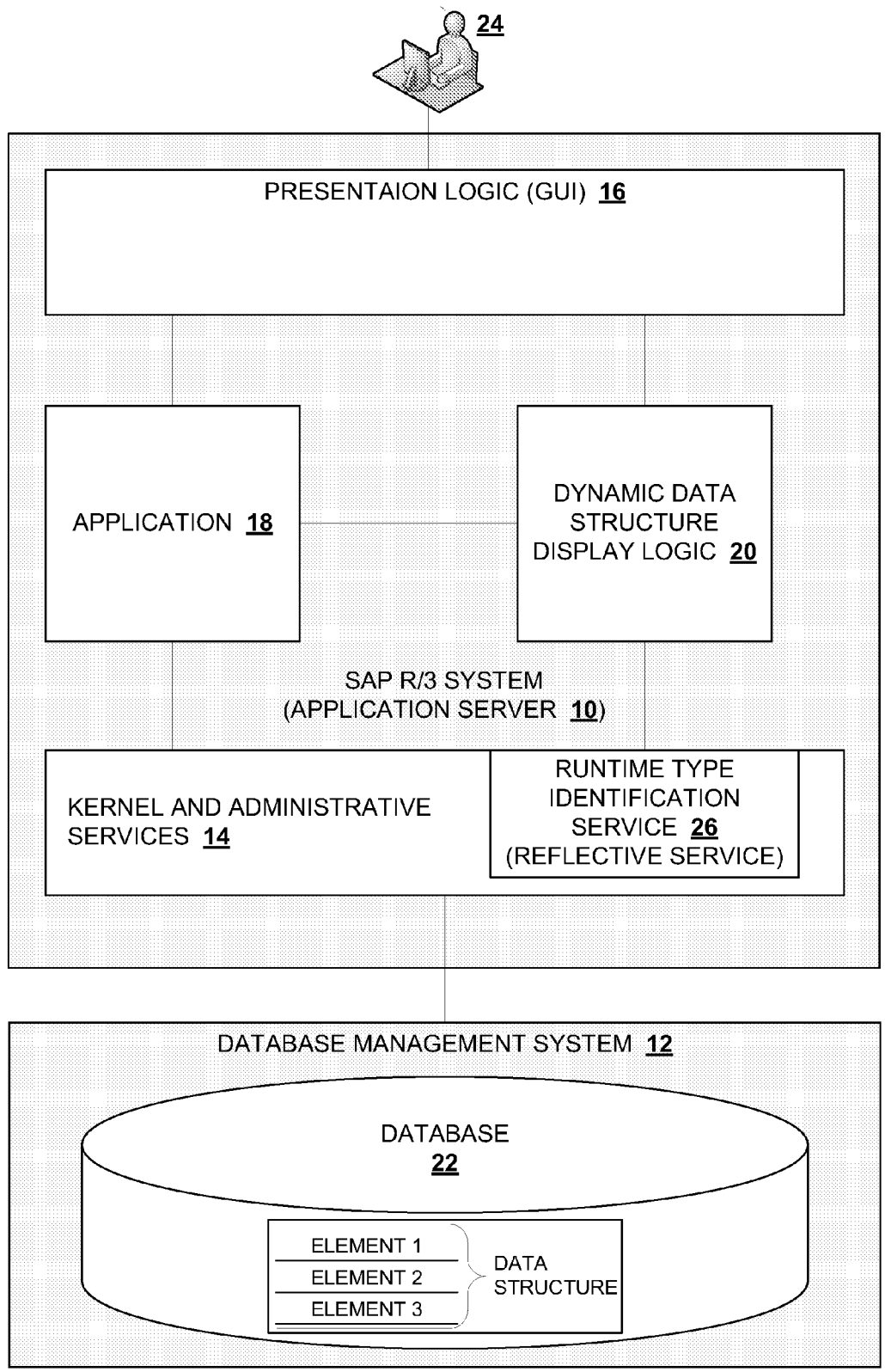
FIG. 1 illustrates a functional block diagram of an example complex software system for which an embodiment of the invention may be implemented.

FIG. 1 illustrates a functional block diagram of an example complex software system for which an embodiment of the invention may be implemented. As illustrated in FIG. 1, an application server 10 is communicatively coupled with a database management system 12. The application server 10 is shown in FIG. 1 to include a kernel and administrative services component 14, presentation logic 16, an application 18 and dynamic data structure display logic 20. In this example, the application server 10 is independent of any particular hardware platform (e.g., processor type) and any particular computer operating system. For instance, various embodiments of the invention may be implemented to work with a wide variety of hardware and software platforms, as well as different database management systems.

In one embodiment, the kernel and administrative services component 14 is a runtime environment for all applications (e.g., application 18) that execute on the system, and accordingly, it provides functionality similar to that of a computer operating system. For instance, the kernel and administrative services component 14 serves as the interface to the underlying database 22 of the database management system 12 and may provide a communication interface to one or more other application servers (not shown).

The presentation logic 16 (also referred to as a user interface service) is responsible for the interaction between the application server 10 and the user 24. In general, a user 24 interacts with an application 18 via a graphical user interface (GUI) provided and managed by the presentation logic 16. In one embodiment of the invention, the presentation logic 16 receives instructions from the dynamic data structure display logic 20 to generate a framework for displaying the composition of a data structure. Specifically, the dynamic data structure display logic 20 may direct the presentation logic 16 to generate and display a table including a listing of the element names and assigned values for each element in a specified data structure.

In general, to display the composition of a particular data structure, a software developer utilizes a software development tool to edit the software code associated with the application 18. In particular, the software developer adds to the application software code an instruction, command or macro command for executing or otherwise directing the operation of the dynamic data structure display logic 20. The instructions, command, or macro command requires only that the software developer provide the particular data structure whose composition is to be displayed, for example, by providing the data structure's name as an argument or parameter of the command. For instance, if the data structure is a table with name ACCOUNTING_PAYEES, a macro command may specify the data structure name as an argument, such as DYNAMIC_DISPLAY(ACCOUNTING_PAYEES). Of course, the actual format of the instruction, command or macro command will vary depending upon the particular implementation.

During execution of the application 18 (i.e., during runtime), when the macro command is executed, a request is directed to the dynamic data structure display logic 20, requesting the display of the data structure (e.g., the current composition of the table, ACCOUNTING_PAYEES). Accordingly, the display of the data structure composition can be achieved during runtime, and requires only a single macro command to be added to the application software code. Consequently, a software developer need not bother with the burdensome task of hard-coding the software code necessary for displaying the composition of the data structure into the software application code.

When the dynamic data structure display logic 20 is called upon to execute and provide the name of a data structure, the display logic 20 first determines the type of the data structure. Specifically, the dynamic data structure display logic 20 communicates a type identification request to a runtime type identification service 26 at the system kernel 14. This service, which may be known by other names in alternative embodiments of the invention, provides a mechanism by which an application can observe, and analyze its own structure—a concept in computer science referred to generally as reflection. Accordingly, in computer science, such a service is frequently referred to as a reflection service. In any case, the runtime type identification service 26 is a service configured to provide requesting processes with the type of a particular data structure. Accordingly, the runtime type identification service 26 responds to the request of the display logic 20 with the type of the particular data structure. For example, in the case of the table ACCOUNTING_PAYEES, the runtime identification service 26 may respond with the type, simple table.

When the display logic 20 receives the type of the particular data structure, the display logic 20 selects a particular process to analyze the data structure. For instance, depending upon the type of the data structure one of a plurality of processes is used to analyze the composition of the data structure, and communicate the composition of the data structure to the presentation logic 16. In the case of the simple table, ACCOUNTING_PAYEES, the display logic 20 selects a particular routine or process for analyzing structures having the type, simple table. The selected process is then utilized to analyze the particular data structure and communicate its composition (e.g., element names and assigned values) to the presentation logic 16. In one embodiment, for example, each element and its assigned value are read in a systematic process until all elements of the data structure have been read. Then, the data are sent to the presentation logic 16, which facilitates the actual display of the data in a tabular format to the user.

Figure 2:
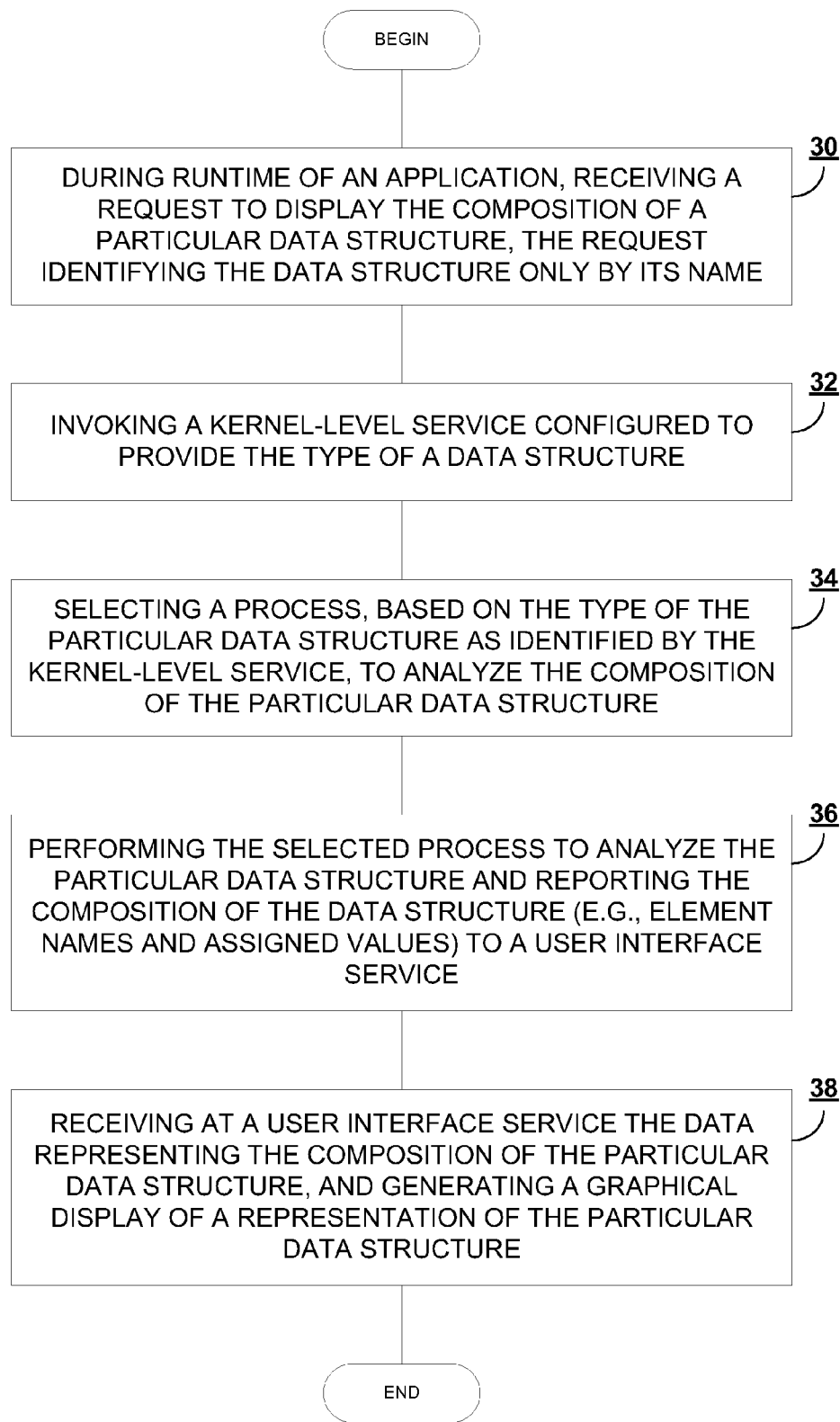
FIG. 2 illustrates a method, according to an embodiment of the invention, for dynamically displaying, during runtime, the composition of a data structure.

FIG. 2 illustrates a method, according to an embodiment of the invention, for dynamically displaying in a tabular format, during runtime, the composition of a data structure. Prior to execution (e.g., prior to runtime) of a particular application, a software developer adds to the software code of an application, a macro command identifying by name only a particular data structure as an argument of the macro command. Then, the method begins at method operation 30 when, during runtime of the application, the macro command is executed and the display logic 20 receives a request to display the composition of the particular data structure. The request resulting from the execution of the macro command includes the name of the data structure. Then, at method operation 32 a kernel-level service is invoked by the display logic 20 to identify the type of the particular data structure. For instance, in one embodiment of the invention, the kernel-level service is the runtime type identification service, which receives as input the name of a particular data structure and returns as output the type of the data structure. In alternative embodiments of the invention, the type of the particular data structure may be determined by, for example, a database look-up procedure, or some procedure other than calling a kernel-level service.

In any case, at method operation 34, the display logic 20 utilizes the type of the particular data structure to select a process for analyzing the data structure. For instance, the display logic 20 may include one or more procedures, each procedure for analyzing the composition of a particular type of data structure. Hence, the procedure for analyzing and displaying a data structure of type "field" may be different than the procedure for analyzing and displaying the composition of a data structure with type "complex table". Accordingly, a procedure is selected from the plurality of procedures based on the particular type of the data structure whose composition is to be displayed.

Next, at method operation 36, the selected procedure is used to analyze the particular data structure. In particular the selected procedure reads the memory or database location of the stored data structure to determine the element names of the elements that make up the data structure, as well as the values assigned to the elements. For instance, a simple table may have several fields (columns) such that each field is assigned a name. The selected procedure would read the name of each field and the assigned value. This analysis may occur systematically such that the elements are read, one-by-one, until each element and assigned value have been determined. After reading all of the elements, the elements and assigned values are communicated to a user interface service, which is ultimately responsible for displaying the composition of the particular data structure to the user.

At method operation 38, the user interface service 16 receives the element names and corresponding assigned values, and generates the appropriate table to display the element names and assigned values. For instance, in one embodiment of the invention, in the case of a structure as a collection of single fields, the user interface service 16 may simply generate a table having a first column that displays the element names, and a second column displaying the values assigned to the elements whose name is displayed in the corresponding row of the first column. When necessary, multiple columns may be utilized to display additional information, such as the type of a particular element, and so on. For instance, when the particular data structure has a type that is complex, such as a complex table, or complex structure, one or more elements of the particular data structure may refer to other data structures. In this case, the type of the sub-structure may be included in a separate display by just doing a forward navigation via mouse click. In one embodiment, the dynamic data structure display logic 20 may communicate to the user interface service 16 certain parameters, for example, indicating the location on a display screen where the table is to be located, the font size to be used, the overall size of the table to be displayed, or other formatting parameters. In an alternative embodiment, these parameters may be set by the application developer (e.g., within the application), or, default values supplied by the presentation logic 16 may be utilized.

In an alternative embodiment of the invention, the user interface service 16 may be a part of the kernel-level services, or a part of the operating system. In such a case, the display logic 20 may direct a kernel-level service or the operating system to display the table. Alternatively, in one embodiment, the dynamic data structure display logic 20 itself may include commands or instructions for displaying the data structure in a tabular format.

Figure 3:
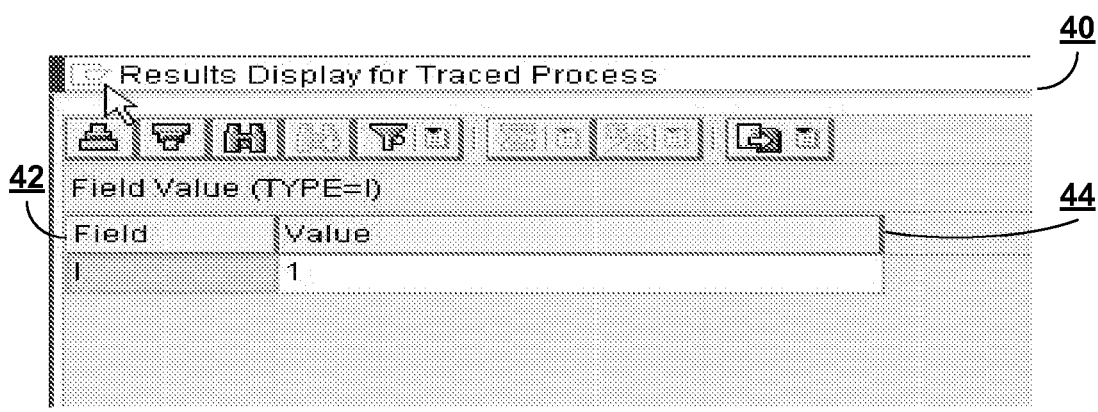
FIG. 3 illustrates an example display of a field type of data structure, and its associated assigned value, as may be generated by an embodiment of the invention.

FIGS. 3 through 10 illustrate specific examples of the type of output generated by an embodiment of the invention. For instance, FIG. 3 illustrates an example display of a field type of data structure, and its associated assigned value, as may be generated by an embodiment of the invention. As illustrated in FIG. 3, there is displayed a table 40 showing the sole element 42 of a data structure having type "field" with its technical name. In addition, the table 40 includes a separate column for the value 44 assigned to the field.

Figure 4:
FIG. 4 illustrates an example display of a simple table type of data structure, and its associated elements and assigned values, as may be generated by an embodiment of the invention.
Figure 5:
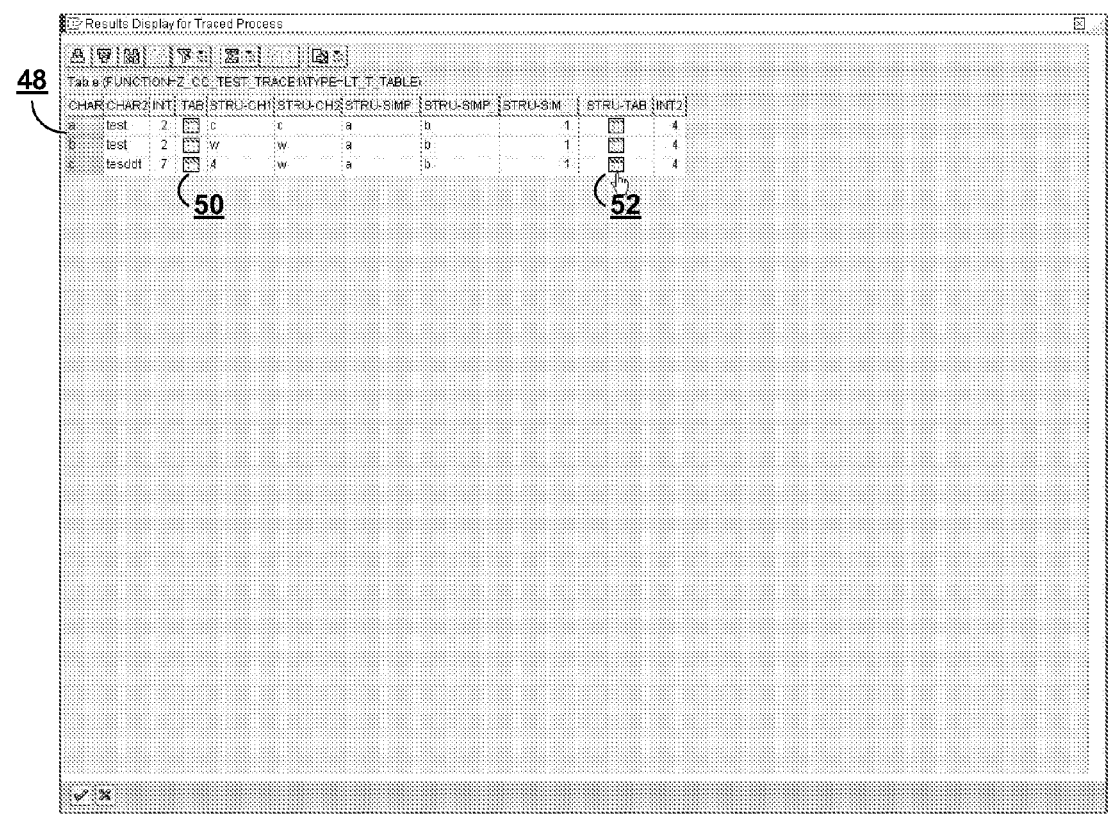

FIGS. 4 and 5 illustrate example displays of a simple table type of data structure, and its associated elements and assigned values, and a complex table type of data structure, and its associated elements and assigned values, as may be generated by an embodiment of the invention. As illustrated in FIG. 4, the simple table 46 has three columns, such that the first row of each column displays the element name, and each subsequent row represents the corresponding assigned values. In FIG. 5, a data structure having type, complex table, is displayed. Similar to the simple table 46 of FIG. 4, the first row of each column in the complex table 48 displays an element name for the table. Each subsequent row represents an assigned value. However, in this case, the complex table 48 includes two nested tables 50 and 52 (the second table is included in a substructure). In one embodiment of the invention, a nested data structure is displayed as a user-selectable link in the form of an icon. Accordingly, selecting the link causes yet another data structure to be displayed.

Figure 6:
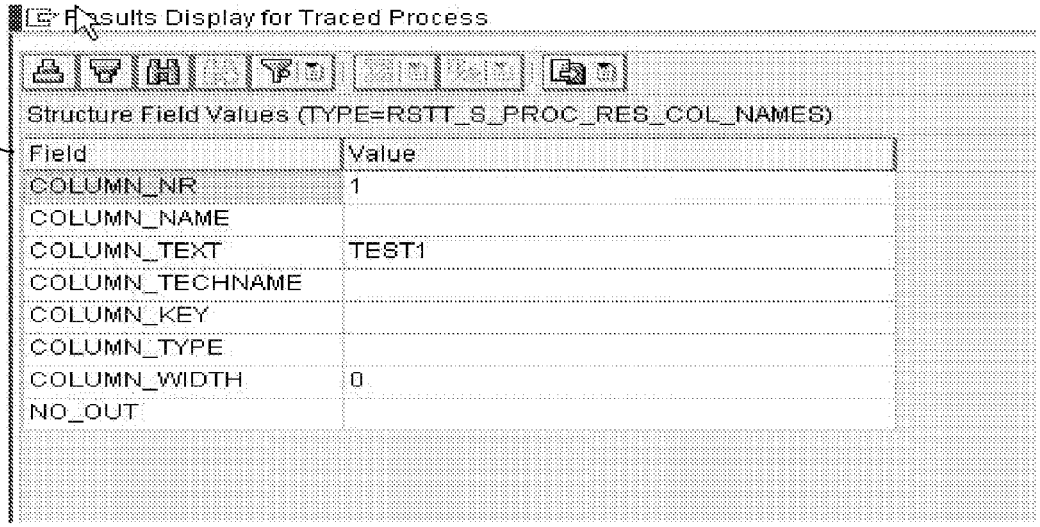
FIG. 6 illustrates an example display of a simple structure type of data structure, and its associated elements and assigned values, as may be generated by an embodiment of the invention.
Figure 7:
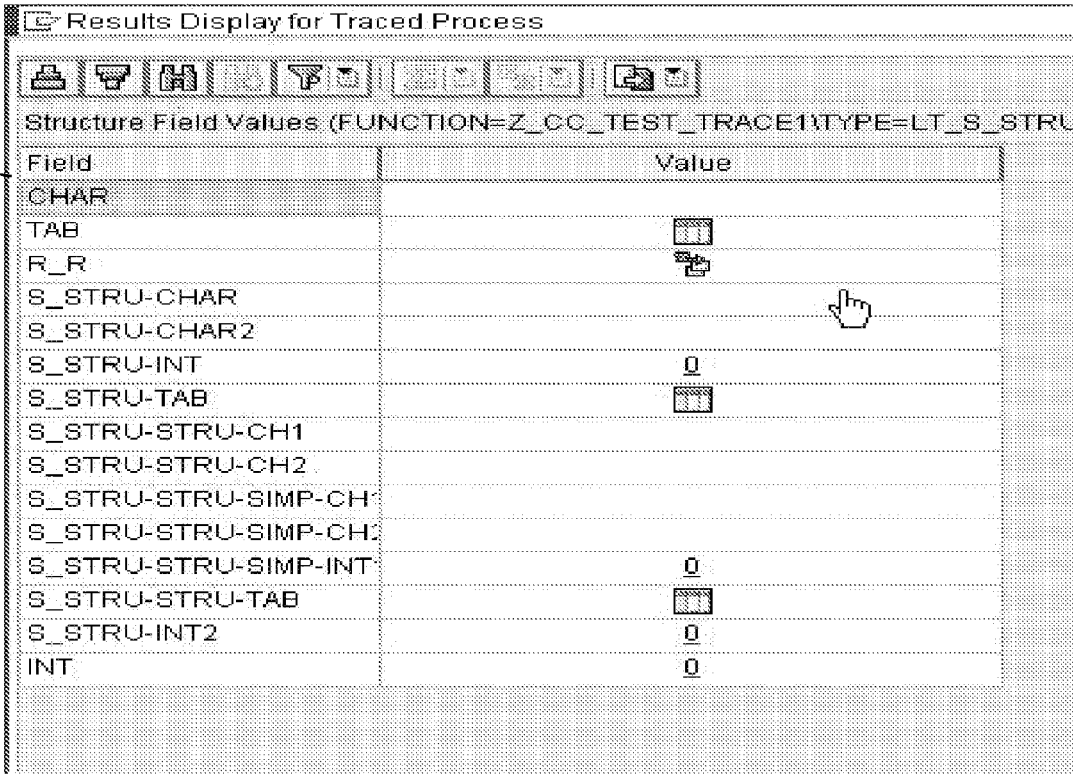
FIG. 7 illustrates an example display of a complex structure type of data structure, and its associated elements and assigned values, as may be generated by an embodiment of the invention.

FIGS. 6 and 7 illustrate example displays of a simple structure type of data structure, and its associated elements and assigned values, and a complex structure type of data structure, and its associated elements and assigned values, as may be generated by an embodiment of the invention. The table 54 displayed in FIG. 6 shows a simple structure, displayed in two columns. The data displayed in the first column represents the element names of the simple structure, while the data shown in the second column represents the values assigned to the elements in the corresponding row of the first column. The table 56 displayed in FIG. 7 is similar to that of FIG. 6, but the sub-structures of the complex structure are represented in the second column as user-selectable links. Accordingly, selecting a link representing a sub-structure will cause that sub-structure to be displayed.

Figure 8:
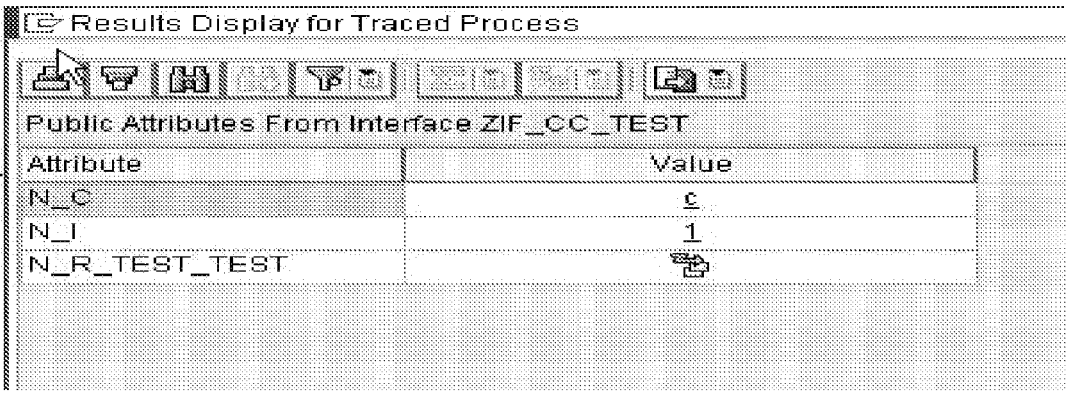
FIG. 8 illustrates an example display of an interface type of an object (object oriented programming), and its associated elements and assigned values, as may be generated by an embodiment of the invention.

FIG. 8 illustrates an example display of an interface type of an object (object oriented programming), and its associated elements and assigned values, as may be generated by an embodiment of the invention. The table 58 displayed in FIG. 8 shows an interface, displayed in two columns. The data displayed in the first column represents the element names of the interface (often referred to as attributes), while the data shown in the second column represents the values assigned to the elements in the corresponding row of the first column.

Figure 9:
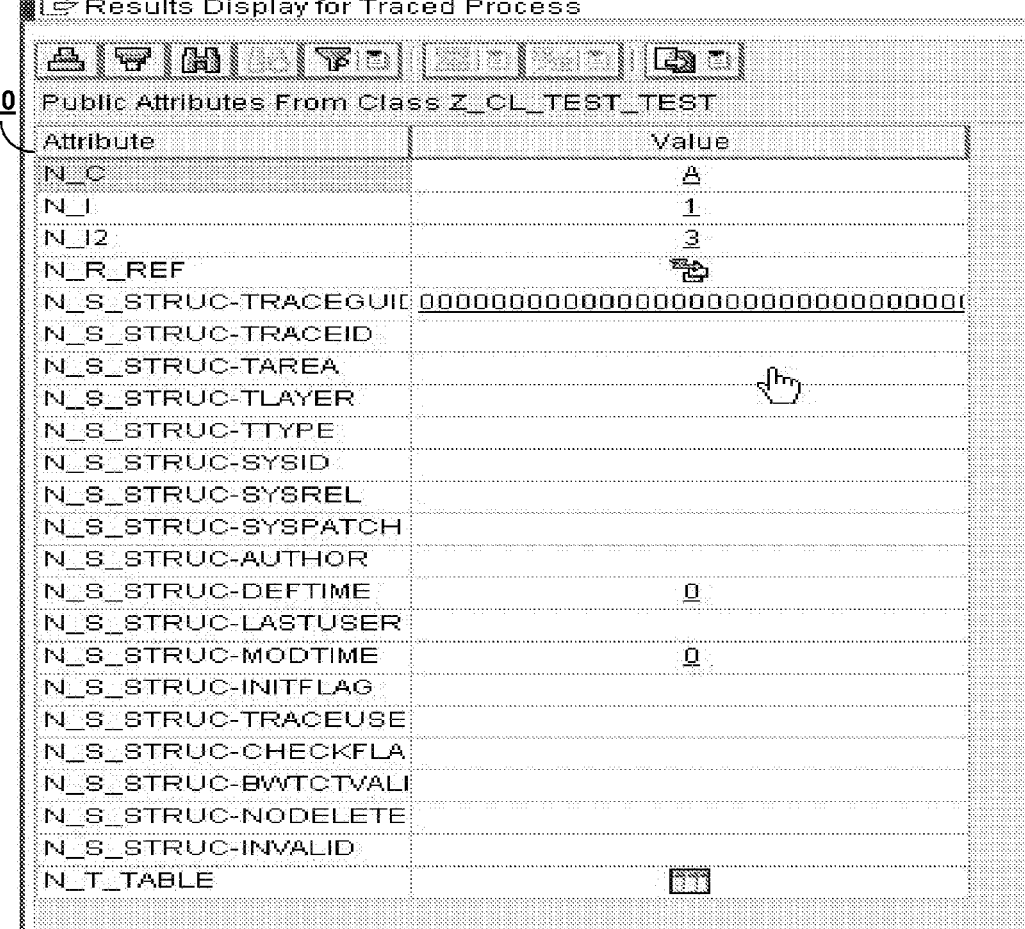
FIG. 9 illustrates an example display of the attributes of an object (object oriented programming), and its associated elements and assigned values, as may be generated by an embodiment of the invention.

FIG. 9 illustrates an example display of an object class type of data structure, and its associated elements and assigned values, as may be generated by an embodiment of the invention. The table 60 displayed in FIG. 9 shows an object of a class, displayed in two columns. The data displayed in the first column represents the names of the element of the class (know as attributes), while the data shown in the second column represents the values assigned to the elements in the corresponding row of the first column.

Figure 10:
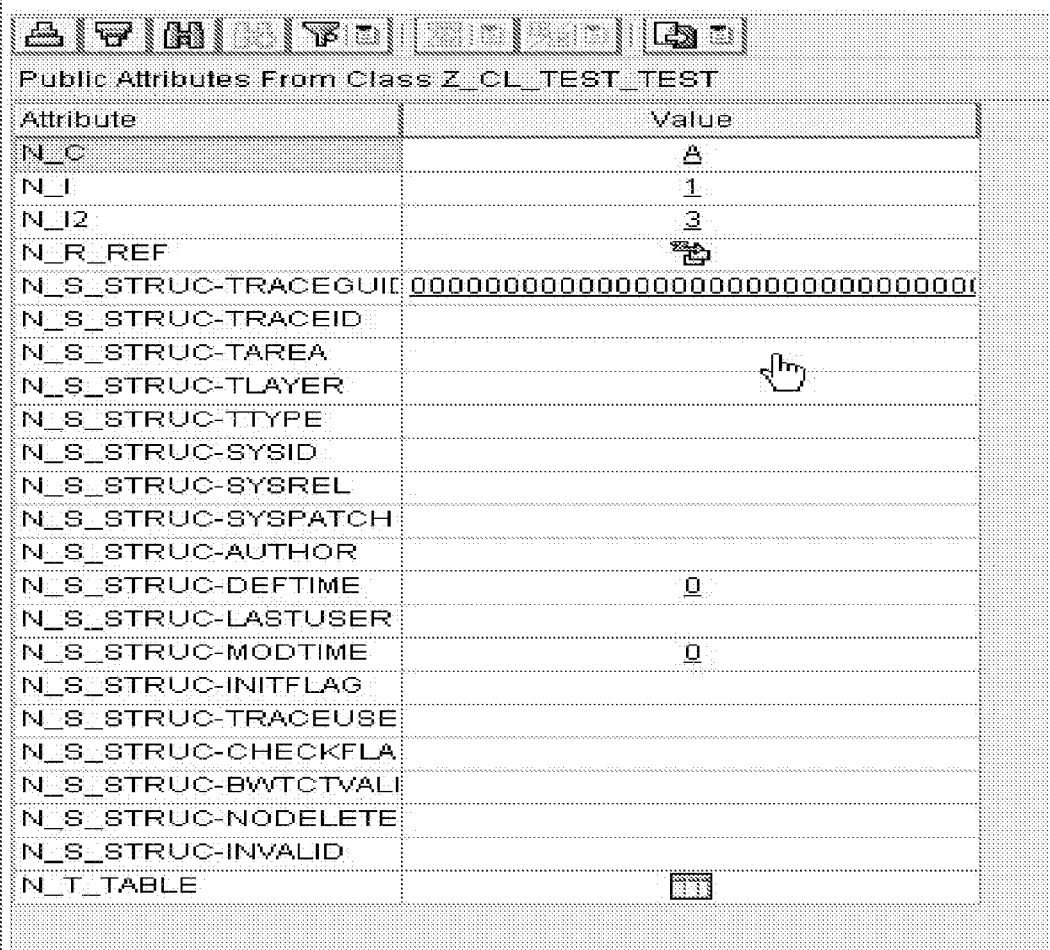

FIGS. 10 and 11 illustrate an example display of a complex structure type of data structure and a table type sub-structure that is referenced by a user-selectable link in the complex structure, according to an embodiment of the invention. As briefly described above, when a complex type of data structure includes as an element one or more references to another data structure (e.g., a sub-structure), the reference to the sub-structure is displayed in the table as a user-selectable link. For instance, the reference to the sub-structure may be depicted as a graphical icon indicating the particular type of the sub-structure. When a user selects the icon, the sub-structure is displayed as a table.

By way of example, the table 62 displayed in FIG. 10 represents a data structure of type, class. The last element in the class (e.g., the element named N_T_TABLE), which is displayed in the last row of the table, is a sub-structure of type, table. In the second column of the last row, a user-selectable icon is shown. When a user selects the graphical icon, the table 64 of FIG. 11 is shown. Accordingly, the graphical icon represents a link to the sub-structure of the data structure shown in table 62 of FIG. 10.

Figure 12:
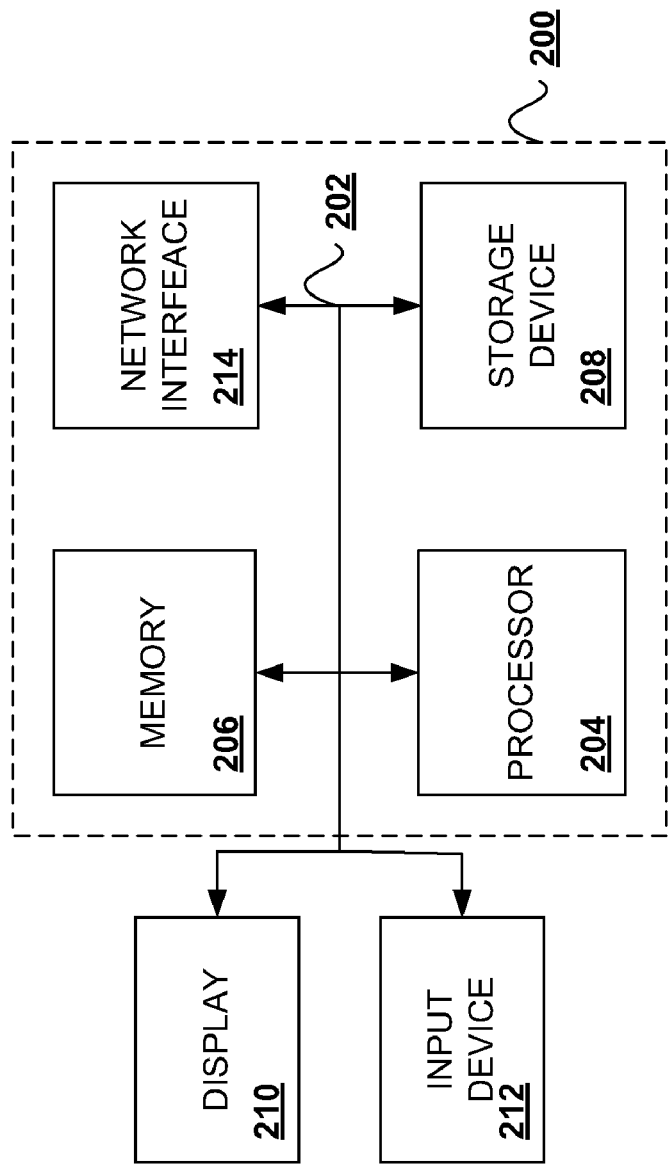
FIG. 12 is a block diagram of an example computer system, which might be utilized to implement various embodiments of the present invention.

FIG. 12 is a block diagram of an example computer system, which might be utilized to implement various embodiments of the present invention. Computer system 200 includes a bus 202 or other communication mechanism for communicating information, and a processor 204 coupled with bus 202 for processing information. Computer system 200 also includes a memory 206 coupled to bus 202 for storing information and instructions to be executed by processor 204, including information and instructions for performing the methods and techniques described above. This memory may also be used for storing temporary variables or other intermediate processing information during execution of instructions to be executed by processor 204. Possible implementations of this memory may be, but are not limited to, random access memory (RAM), read only memory (ROM), or both. A non-volatile mass storage device 208 is also provided for storing information and instructions. Common forms of storage devices include, for example, a hard drive, a magnetic disk, an optical disk, a CD-ROM, a DVD, a flash memory, a USB memory card, a solid state drive or any other medium from which a computer can read. Storage device 208 may be utilized to store source code, binary code, or software files for performing the methods and/or techniques described above, or for embodying the constructs above, for example. In one embodiment of the invention, a computer program product for performing the methods described above may be stored on a computer-readable medium, such as storage device 208.

Computer system 200 may be coupled via bus 202 (or another bus) to a display 210, such as a cathode ray tube (CRT), liquid crystal display (LCD), or organic light emitting diode (OLED) display for displaying information to a computer user. An input device 212 such as a keyboard and/or mouse is coupled to bus 202 for communicating information and command selections from the user to processor 204. The combination of these components allows the user to communicate with the system. In some systems, bus 202 may be divided into multiple specialized buses.

Computer system 200 also includes a network interface 214 coupled with bus 202. Network interface 214 may provide two-way data communication between computer system 200 and a local area network (LAN). The network interface 214 may be a digital subscriber line (DSL) or other modem device to provide a data communication connection over a telephone line, for example. Another example of the network interface is a network interface card (NIC) to provide a data communication connection to a compatible LAN. Wireless communication links may also be established, for example, with a wireless network interface card. In any such implementation, network interface 214 sends and receives electrical, electromagnetic, or optical signals that carry digital data streams representing various types of information.

Computer system 200 can send and receive information, including messages or other interface actions, through the network interface 214 to a private or public intranet or internet. In the internet example, software components or services may reside on multiple different computer systems or servers across the network. A server may transmit actions or messages from one component, through an internet, local network, and/or network interface 214 to a component on computer system 200.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:

during execution of an application, receiving from the application a request to display the composition of a data structure, wherein the request identifies the data structure by a name;

invoking a system-level service via a communication of a type identification request, which includes the name, to a runtime type identification service at the system kernel to identify a type of the data structure;

receiving from the runtime type identification service a reply indicating the type and a location of the data structure;

based on the type of the data structure, selecting a procedure for analyzing the data structure to determine the composition of the data structure; and analyzing the data structure according to the selected procedure to determine its composition while systematically communicating the composition of the data structure to a user interface service so as to enable the user interface service to generate a graphical display representing the composition of the data structure.

2. The computer-implemented method of claim 1 wherein the data structure is an advanced business application programming (ABAP) data object from the group: field, simple structure, complex structure, simple table, complex table, interface, class, object, data reference, and object reference.

3. The computer-implemented method of claim 2, wherein the request to display the composition of the data structure is received at a dynamic display generator process in response to the application executing an ABAP macro command.

4. The computer-implemented method of claim 3, wherein systematically communicating the composition of the data structure to a user interface service includes, for each element of the data structure, reading the name of the element of the data structure and its assigned value, and then communicating the name and the assigned value to the user interface service.

5. The computer-implemented method of claim 4, further comprising:

communicating to the user interface service a format to be utilized in generating the graphical display representing the composition of the data structure.

6. The computer-implemented method of claim 5, further comprising:

including in the graphical display representing the composition of the data structure a user-selectable link to a second data structure, wherein the link, when selected, causes a recursive operation to be performed resulting in the graphical display of a representation of the second data structure.

7. A non-transitory computer-readable medium having instructions stored thereon, which, when executed by a computer, cause the computer to perform a method comprising:

during execution of an application, receiving from the application a request to display the composition of a data structure, wherein the request identifies the data structure by a name;

invoking a system-level service via a communication of a type identification request, which includes the name, to a runtime type identification service at the system kernel to identify a type of the data structure;

receiving from the runtime type identification service a reply indicating the type and a location of the data structure; and analyzing the data structure according to the selected procedure to determine its composition while systematically communicating the composition of the data structure to a user interface service so as to enable the user interface service to generate a graphical display representing the composition of the data structure.

8. The computer-readable medium of claim 7 wherein the data structure is an advanced business application programming (ABAP) data object from the group: field, simple structure, complex structure, simple table, complex table, interface, class, object, data reference, and object reference.

9. The computer-readable medium of claim 8, wherein the request to display the composition of the data structure is received at a dynamic display generator process in response to the application executing an ABAP macro command.

10. The computer-readable medium of claim 9, wherein systematically communicating the composition of the data structure to a user interface service includes, for each element of the data structure, reading the name of the element of the data structure and its assigned value, and then communicating the name and the assigned value to the user interface service.

11. The computer-readable medium of claim 10, having further instructions causing the computer to perform additional method operations comprising:

communicating to the user interface service a format to be utilized in generating the graphical display representing the composition of the data structure.

12. The computer-readable medium of claim 11, having further instructions causing the computer to perform additional method operations comprising:

including in the graphical display representing the composition of the data structure a user-selectable link to a second data structure, wherein the link, when selected, causes a recursive operation to be performed resulting in the graphical display of a representation of the second data structure.

13. An apparatus having a processor and memory for executing instructions, the apparatus further comprising:

an application having a command for calling a dynamic data structure display generator configured to display, at runtime, the composition of a data structure by generating a graphical display in a tabular format of a representation of the data structure, the command requiring a single argument identifying the name of the data structure;

a kernel-level service configured to receive a type-identification request from the dynamic data structure display generator and respond with the type and location of the named data structure; and a user interface service for generating the display framework and displaying the composition of the data structure, wherein, after receiving the type and location of the named data structure, the dynamic data structure display generator analyzes the data structure in accordance with a process selected from a plurality of processes based on the type of the data structure, and systematically communicates the composition of the data structure to the user interface service, when the dynamic data structure display generator systematically communicates the composition of the data structure to the user interface service, the dynamic data structure display generator reads the name of an element of the data structure and its assigned value, and then communicates the name and the assigned value to the user interface service so as to enable the user interface service to display the elements of the data structure in a tabular format.

14. The apparatus of claim 13 wherein the data structure is an advanced business application programming (ABAP) data object from the group: field, simple structure, complex structure, simple table, complex table, interface, class, object, data reference, and object reference.

15. The apparatus of claim 13, wherein the dynamic data structure display generator includes in the graphical display representing the composition of the data structure a user-selectable link to a second data structure, wherein the link, when selected, causes a recursive operation to be performed resulting in the graphical display of a representation of the second data structure.

\* \* \* \* \*